US012406245B2

(12) United States Patent
Barrett

(10) Patent No.: US 12,406,245 B2
(45) Date of Patent: *Sep. 2, 2025

(54) COMPUTING SYSTEM IMPLEMENTING SECONDARY AUTHORIZATIONS FOR PREPAID TRANSACTIONS

(71) Applicant: Expensify, Inc., San Francisco, CA (US)

(72) Inventor: David M. Barrett, San Francisco, CA (US)

(73) Assignee: Expensify, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,040

(22) Filed: Oct. 13, 2023

(65) Prior Publication Data

US 2024/0104536 A1  Mar. 28, 2024

Related U.S. Application Data

(63) Continuation of application No. 17/568,543, filed on Jan. 4, 2022, now Pat. No. 11,829,973, which is a
(Continued)

(51) Int. Cl.
G06Q 20/20 (2012.01)
G06Q 20/22 (2012.01)
G06Q 20/40 (2012.01)

(52) U.S. Cl.
CPC ........... *G06Q 20/20* (2013.01); *G06Q 20/227* (2013.01); *G06Q 20/4037* (2013.01)

(58) Field of Classification Search
None
See application file for complete search history.

(56) References Cited

U.S. PATENT DOCUMENTS 5,578,808 A   11/1996  Taylor
6,018,735 A    1/2000  Hunter
(Continued)

FOREIGN PATENT DOCUMENTS

CN   106416318 A   2/2017
EP     2372625 A1  10/2011
GB    0621189.0    12/2006
(Continued)

OTHER PUBLICATIONS

P. Kalnis, G. Ghinita, K. Mouratidis and D. Papadias, "Preventing Location-Based Identity Inference in Anonymous Spatial Queries," in IEEE Transactions on Knowledge and Data Engineering, vol. 19, No. 12, pp. 1719-1733, Dec. 2007. (Year: 2007).
(Continued)

*Primary Examiner* — Fateh M Obaid
(74) *Attorney, Agent, or Firm* — Mahamedi IP Law LLP

(57) ABSTRACT

A computing system can receive a primary authorization request from a merchant terminal of a merchant, the primary authorization request corresponding to use of a prepaid payment means of a user of the transaction service for a transaction with the merchant. Based on receiving the primary authorization request, the system can determine that an account balance of the prepaid payment means comprises inadequate funds to fulfill the transaction and automatically transmit a secondary authorization request to a financial entity associated with an account of the user. Upon receiving an approval of the secondary authorization request, the system can execute a transfer for a difference amount, based on an amount corresponding to the transaction, from the account of the user to an account associated with the merchant.

20 Claims, 5 Drawing Sheets

Related U.S. Application Data continuation of application No. 16/869,379, filed on May 7, 2020, now Pat. No. 11,263,611, which is a continuation of application No. 15/785,221, filed on Oct. 16, 2017, now Pat. No. 10,699,260, which is a continuation of application No. 12/193,590, filed on Aug. 18, 2008, now Pat. No. 9,830,582.

(60) Provisional application No. 60/956,691, filed on Aug. 18, 2007.

(56) References Cited

U.S. PATENT DOCUMENTS

| | | |
|---|---|---|
| 6,065,675 A | 5/2000 | Teicher |
| 6,473,500 B1 | 10/2002 | Risafi et al. |
| 6,615,190 B1 | 9/2003 | Slater |
| 7,104,443 B1 | 9/2006 | Paul et al. |
| 7,127,426 B1 | 10/2006 | Coyle |
| 7,249,092 B2 | 7/2007 | Dunn et al. |
| 7,252,223 B2 | 8/2007 | Schofield |
| 7,280,644 B2 | 10/2007 | Tamari et al. |
| 7,401,731 B1 | 7/2008 | Pletz et al. |
| 7,475,808 B1 | 1/2009 | Bishop |
| 7,567,934 B2 | 7/2009 | Flitcroft et al. |
| 7,571,142 B1 | 8/2009 | Flitcroft et al. |
| 7,720,755 B1* | 5/2010 | Coyle ............... G06Q 20/10 705/40 |
| 7,769,611 B1 | 8/2010 | Rodriguez |
| 7,865,432 B2 | 1/2011 | Doran et al. |
| 7,873,573 B2 | 1/2011 | Realini |
| 8,560,353 B2 | 10/2013 | Smith |
| 8,595,116 B1 | 11/2013 | Bettinger, II |
| 9,245,296 B2 | 1/2016 | Nuggehalli |
| 9,613,487 B2 | 4/2017 | Kelly |
| 9,691,056 B2 | 6/2017 | Bouey |
| 9,830,582 B1 | 11/2017 | Barrett |
| 10,055,740 B2 | 8/2018 | Hanson |
| 10,163,092 B2 | 12/2018 | Barrett |
| 10,540,646 B2 | 1/2020 | Schlosser |
| 2001/0047334 A1* | 11/2001 | Nappe ............... G07F 7/08 705/41 |
| 2002/0002534 A1 | 1/2002 | Davis |
| 2002/0013767 A1 | 1/2002 | Katz |
| 2002/0117541 A1 | 8/2002 | Biggar |
| 2002/0194096 A1 | 12/2002 | Falcone |
| 2002/0194122 A1 | 12/2002 | Knox |
| 2002/0196280 A1 | 12/2002 | Bassett |
| 2003/0028285 A1 | 2/2003 | Zura |
| 2003/0033211 A1 | 2/2003 | Haines |
| 2003/0055754 A1 | 3/2003 | Sullivan |
| 2003/0131023 A1 | 7/2003 | Bassett |
| 2003/0144910 A1 | 7/2003 | Flaherty |
| 2003/0191709 A1 | 10/2003 | Elston |
| 2003/0222136 A1 | 12/2003 | Bolle et al. |
| 2004/0007618 A1 | 1/2004 | Oram |
| 2004/0039694 A1 | 2/2004 | Dunn |
| 2004/0122685 A1 | 6/2004 | Bunce |
| 2004/0236692 A1 | 11/2004 | Sellen |
| 2004/0254835 A1 | 12/2004 | Thomas |
| 2005/0043999 A1 | 2/2005 | Ji et al. |
| 2005/0091153 A1 | 4/2005 | Monk |
| 2005/0182711 A1 | 8/2005 | Pulkkinen et al. |
| 2005/0203824 A1 | 9/2005 | Freud |
| 2006/0023248 A1 | 2/2006 | Reese et al. |
| 2006/0037835 A1 | 2/2006 | Doran |
| 2006/0053067 A1 | 3/2006 | Driessen |
| 2006/0069642 A1 | 3/2006 | Doran |
| 2006/0104426 A1 | 5/2006 | Cataldi |
| 2006/0155641 A1 | 7/2006 | Postrel |
| 2006/0190347 A1 | 8/2006 | Cuervo |
| 2006/0218024 A1 | 9/2006 | Lulla |
| 2006/0230004 A1 | 10/2006 | Handley |
| 2007/0045407 A1 | 3/2007 | Paul |
| 2007/0078761 A1 | 4/2007 | Kagan |
| 2007/0119920 A1 | 5/2007 | Hogg et al. |
| 2007/0119923 A1 | 5/2007 | Garrison |
| 2007/0150414 A1 | 6/2007 | Templeton |
| 2007/0187492 A1 | 8/2007 | Graves |
| 2007/0198403 A1* | 8/2007 | Aloni ............... G06Q 40/03 705/39 |
| 2007/0233615 A1 | 10/2007 | Tumminaro |
| 2007/0244811 A1 | 10/2007 | Tumminaro |
| 2007/0250441 A1 | 10/2007 | Paulsen et al. |
| 2007/0255650 A1 | 11/2007 | Destrempes et al. |
| 2007/0255653 A1 | 11/2007 | Tumminaro |
| 2007/0255662 A1 | 11/2007 | Tumminaro |
| 2008/0017703 A1 | 1/2008 | Lu et al. |
| 2008/0040261 A1 | 2/2008 | Nix et al. |
| 2008/0040274 A1 | 2/2008 | Uzo |
| 2008/0040275 A1 | 2/2008 | Paulsen |
| 2008/0046347 A1 | 2/2008 | Smith |
| 2008/0103972 A1* | 5/2008 | Lanc ............... G06Q 20/405 705/44 |
| 2008/0177649 A1 | 7/2008 | Heywood |
| 2009/0048884 A1* | 2/2009 | Olives ............... G06Q 40/00 705/40 |
| 2009/0094126 A1 | 4/2009 | Killian |
| 2009/0228380 A1 | 9/2009 | Evanitsky |
| 2009/0249194 A1 | 10/2009 | Day |
| 2009/0259547 A1 | 10/2009 | Clopp |
| 2009/0271265 A1 | 10/2009 | Lay et al. |
| 2009/0271322 A1 | 10/2009 | Lay |
| 2009/0276305 A1 | 11/2009 | Clopp |
| 2010/0094668 A1 | 4/2010 | Gupta |
| 2010/0185536 A1 | 7/2010 | Rentala |
| 2010/0312696 A1 | 12/2010 | Sinha |
| 2011/0010277 A1 | 1/2011 | Enzaldo |
| 2011/0131135 A1 | 6/2011 | Carlson |
| 2011/0251907 A1 | 10/2011 | Tavares |
| 2011/0270618 A1 | 11/2011 | Banerjee |
| 2011/0313926 A1 | 12/2011 | Templeton |
| 2012/0066120 A1 | 3/2012 | Ringewald |
| 2012/0136790 A1 | 5/2012 | Templeton |
| 2012/0203572 A1 | 8/2012 | Christensen |
| 2012/0221422 A1 | 8/2012 | Sobek |
| 2012/0221446 A1 | 8/2012 | Grigg |
| 2012/0265625 A1 | 10/2012 | Pletz et al. |
| 2012/0296814 A1* | 11/2012 | Templeton ............... G06Q 40/00 705/44 |
| 2013/0191278 A1 | 7/2013 | O'Leary |
| 2013/0198081 A1 | 8/2013 | Royyuru et al. |
| 2013/0297511 A1 | 11/2013 | Monk |
| 2013/0304559 A1 | 11/2013 | Stone |
| 2013/0339099 A1 | 12/2013 | Aidroos |
| 2014/0040131 A1 | 2/2014 | Andrews |
| 2014/0115678 A1 | 4/2014 | Thodupunoori |
| 2014/0250016 A1 | 9/2014 | Kranzley |
| 2015/0019944 A1 | 1/2015 | Kalgi |
| 2015/0026049 A1 | 1/2015 | Theurer |
| 2015/0065107 A1 | 3/2015 | Dave |
| 2015/0254647 A1 | 9/2015 | Bondesen |
| 2015/0254656 A1 | 9/2015 | Bondesen |
| 2015/0269553 A1 | 9/2015 | Barrett |
| 2015/0269560 A1 | 9/2015 | Barrett |
| 2016/0012413 A1 | 1/2016 | Chitilian |
| 2016/0012465 A1 | 1/2016 | Sharp |
| 2016/0055512 A1 | 2/2016 | Godsey |
| 2016/0069705 A1 | 3/2016 | Brenner |
| 2016/0314465 A1 | 10/2016 | Martin |
| 2017/0109663 A1 | 4/2017 | Barrett |
| 2017/0193410 A1 | 7/2017 | Jones-Mc-Fadden |
| 2017/0220976 A1* | 8/2017 | Schmidt ............... G06Q 10/083 |
| 2018/0082221 A1 | 3/2018 | DiTomaso |
| 2018/0096327 A1 | 4/2018 | Barrett |
| 2018/0336549 A1 | 11/2018 | Barrett |
| 2019/0034906 A1 | 1/2019 | Barrett |
| 2019/0220849 A1 | 7/2019 | Barrett |
| 2019/0295054 A1 | 9/2019 | Purves |
| 2019/0392358 A1 | 12/2019 | Barrett |
| 2020/0226578 A1 | 7/2020 | Barrett |
| 2020/0327523 A1 | 10/2020 | Barrett |
| 2021/0209581 A1 | 7/2021 | Barrett |
| 2021/0264329 A1 | 8/2021 | Barrett |

(56) References Cited

U.S. PATENT DOCUMENTS

2022/0108295 A1 4/2022 Barrett
2022/0129875 A1 4/2022 Barrett
2022/0335409 A1 10/2022 Barrett

FOREIGN PATENT DOCUMENTS

JP 2017224039 A 12/2017
WO WO-2010/131988 11/2010

OTHER PUBLICATIONS

Adam J. Levitin; Payment Wars: The Merchant-Bank Struggle Control of Payment Systems; 12 Stan. J. L. Bus. & Fin. 425 (2006-2007), pp. 425-485 (Spring 2007).

John Bulmer; Payment Systems: The Debt Market in Canada; Parliamentary Information and Research Service, International Affairs, Trade and Finance Division (Sep. 24, 2009).

Julia S. Cheney; Prepaid Card Models: A Study in Diversity; Federal Reserve Bank of Philadelphia Payment Cards Center Discussion Paper No. 05-03 (Nov. 11, 2006).

Susan Hillman, "Notional vs. Pysical Cash Pooling Revisited," International Treasurer, pp. 1-4 (Feb. 2011).

Koen Vestrepen and Bart Goethals. Top-N Recommendation for Shared Accounts. Proceedings of the 9th ACM Conference on Recommender Systems. pp. 59-66. Sep. 2015. (Year: 2015).

L.G. Jaimes, I. Vergara-Laurens and M.A. Labradoe. "A location-based incentive mechanism for participatory sensing system with budget constraints," 2012 IEEE *International Conference on Pervasive Computing and Communications*, Lugano, Switzerland, 2012, pp. 103-108.

F. Dominici, D. Mazzocchi, P. Mulassano, M. Spelat, G. Boiero, P. Lovisolo. "NAV/COM Hybrid Architecture for Innovative Location Based Payment Systems", 2009 6th IEEE *Consumer Communications and Networking Conferen*, Las Vegas, NV, USA, 2009, pp. 1-5.

\* cited by examiner

Figure 2 – Related Art

COMPUTING SYSTEM IMPLEMENTING SECONDARY AUTHORIZATIONS FOR PREPAID TRANSACTIONS

CROSS-REFERENCE TO RELATED APPLICATIONS

This application is a continuation of U.S. patent application Ser. No. 17/568,543, filed on Jan. 4, 2022; which is a continuation of U.S. patent application Ser. No. 16/869,379, filed on May 7, 2020, now issued as U.S. Pat. No. 11,263,611; which is a continuation of U.S. patent application Ser. No. 15/785,221, filed on Oct. 16, 2017, now issued as U.S. Pat. No. 10,699,260; which is a continuation of U.S. patent application Ser. No. 12/193,590, filed on Aug. 18, 2008, now issued as U.S. Pat. No. 9,830,582; which claims the benefit of U.S. Provisional Patent Application Ser. No. 60/956,691, filed Aug. 18, 2007, in the United States Patent and Trademark Office—the aforementioned applications being incorporated by reference herein in their respective entireties.

BACKGROUND

This application relates to a system, computer readable medium, and method for transaction authorization, specifically with respect to financial networks and prepaid electronic payment cards.

DESCRIPTION OF THE RELATED ART

Individuals and businesses are increasingly turning to prepaid cards as a reliable means to enable cardholders to make electronic and in-person purchases without the inconvenience of cash or the risk of credit. Prepaid cards broadly fall into two categories: "closed loop" cards that are tied to a particular merchant (Sears™, Starbucks™, etc) for loyalty or incentive purposes, and "open loop" cards that are branded with the logo of a major network (Visa™, MasterCard™, Discover™, etc.) and usable at any merchant that accepts that logo.

The most notable form of prepaid card—for both open and closed-loop cards—is the "gift card". A gift card is a consumer product where one individual "loads" funds onto the card and then gives the card to someone as a gift. The recipient then uses this card in lieu of cash to either purchase from a given merchant (in the case of a closed-loop card), or anywhere the card's logo is accepted (open-loop card).

Another form of prepaid card is the "expense card"—typically an open-loop card—where an employer loads funds onto the prepaid card and distributes to employees to make business purchases.

Additional forms exist for remittance purposes (a family member in one country loads funds onto the card to be spent by the family in another country), payroll services (the paycheck of an employee is loaded onto the prepaid card instead of going to a bank account), and so on.

Unlike a "credit card", where each purchase draws from a line of credit associated with the card, every purchase authorized by a prepaid card is supported by funds that have been secured by the card's issuer before the purchase is authorized. As such, the risk of non-payment experienced by issuers of credit cards is almost completely avoided by issuers of prepaid cards.

But this safety advantage to prepaid card issuers creates a corresponding disadvantage for prepaid card customers. Specifically, the customer purchasing the prepaid card must "load" funds onto the card before it can be used. Unlike a credit card which can be used to purchase up to a certain limit with the understanding that it will be later repaid, the prepaid card can only be used when funds are loaded onto the card in advance.

This disadvantage is further compounded by the simple fact that the customer of the prepaid card generally does not know at the time funds are loaded on the card, exactly what will be purchased. Accordingly, the customer must typically load onto the card the maximum amount that could conceivably be used, even if that means putting more funds onto the card than will actually be used.

Similarly, a disadvantage of the prepaid model is funds are typically loaded onto the card days, weeks, or months prior to any purchase actually occurring. During this period, those same funds cannot be used for any other purchase, cannot be used for investment purposes, cannot be used to pay off debt, etc.

Finally, the largest disadvantage of the prepaid model is after a purchase is actually made, there are generally funds left on the card. These funds are often insufficient for any significant purchase, and thus are ignored and never actually spent. Unspent funds on prepaid cards are classified as "abandoned" after some period of inactivity (or expiration of the card), and often default to the card issuer or the state—but rarely to the customer who purchased the card or the person who holds it.

It would therefore be desirable to alleviate the disadvantages experienced by prepaid card customers whilst preserving the benefits enjoyed by prepaid card issuers.

Description—FIG. 1

A system in the prior art is illustrated in FIG. 1. The system involves a cardholder 110 interacting with a merchant terminal 120 connected via a network 125 to a merchant gateway 130, which is in turn connected via a network 135 to an authorization switch 140. The system also involves a prepaid card 141, which is managed by the authorization switch 140, held by the cardholder 110, and associated with a prepaid account 142.

Operation—FIG. 2

The manner of operation of the system illustrated in FIG. 1 is illustrated by the flowchart in FIG. 2, and begins with step 201 where cardholder 110 presenting prepaid card 141 to merchant terminal 120, for example by physically swiping the card through a magnetic stripe reader.

In step 202, merchant terminal 120 sends an authorization request via network 125 to merchant gateway 130, which then sends the authorization request via network 135 to authorization switch 140.

In step 203, authorization switch 140 retrieves the prepaid account 142 associated with prepaid card 141, for example from a database. Authorization switch 140 then compares the purchase amount contained in the authorization request with information in the prepaid account one example being the current account balance. If the account balance is at least equal to or less than the purchase amount in the authorization request, authorization switch 140 approves or declines the authorization request, respectively.

In step 204, authorization switch 140 approves the authorization request by responding via network 135 to merchant gateway 130, which in turn responds via network 125 to merchant terminal 120.

In step 205, merchant terminal 120 approves the purchase request of cardholder 110.

Alternatively, in step 206, authorization switch 140 declines the authorization request by responding via network 135 to merchant gateway 130, which in turn responds via network 125 to merchant terminal 120.

In step 207, merchant terminal 120 declines the purchase request of cardholder 110.

SUMMARY

In accordance with the exemplary embodiment, a system, computer readable medium, and method for a first authorization switch to safely authorize a primary authorization request involving a prepaid card and corresponding prepaid account that lacks adequate funds by loading funds onto the prepaid card "on-demand" by sending a secondary authorization request to a second authorization switch and obtaining a "promise to pay" from a funding account.

An exemplary embodiment includes a method for authorizing a purchase transaction, using a prepaid card, between a cardholder and a funding account, using an intermediate prepaid account, the method comprising: issuing of a prepaid card to a cardholder, wherein said prepaid card comprises a corresponding prepaid account managed by a first authorization switch; associating of a funding account identifier to said prepaid account, wherein said funding account identifier comprises a corresponding funding account managed by a second authorization switch; initiating, by said cardholder, a primary authorization request using said prepaid card; initiating, by said first authorization switch, a secondary authorization request using said funding account identifier; authorizing, by said second authorization switch, said secondary authorization request using said funding account identifier; authorizing, by said first authorization switch, said primary authorization request using the response from said secondary authorization request.

A further exemplary embodiment includes a system for authorizing a purchase transaction, using a prepaid card, between a cardholder and a funding account, using an intermediate prepaid account, said system comprising: a prepaid card held by a cardholder; a first merchant terminal capable of sending a primary authorization request via a network; a first authorization switch; a prepaid account database storing a prepaid account record identified by a prepaid account identifier, whereby said prepaid account identifier is encoded onto said prepaid card; a second merchant terminal capable of sending a secondary authorization request via a network; a second authorization switch; a funding account database storing a funding account record identified by a funding account identifier, whereby said funding account identifier is stored within said prepaid account record; whereby said first merchant terminal retrieves said prepaid account identifier from said prepaid card, and whereby said first merchant terminal sends said primary authorization request comprising said prepaid account identifier to said first authorization switch, and whereby said first authorization switch uses said prepaid account identifier to retrieve said prepaid account record from said prepaid account database, and whereby said first authorization switch retrieves said funding account identifier from said prepaid account record, and whereby said first authorizations switch manipulates said second merchant terminal so as to send said second authorization request comprising said funding account identifier to said second authorization switch, and whereby said second authorization switch uses said funding account identifier from said secondary authorization request to retrieve said funding account record from a database, and whereby said second authorization switch determines from information within said funding account record whether to approve or decline said second authorization request, and whereby said second authorization switch responds to said second merchant terminal, and whereby said second merchant terminal notifies said first authorization switch of said response to said secondary authorization request, and whereby said first authorization switch determines from said response to said secondary authorization request whether to approve or decline said primary authorization request, and whereby said first authorization switch responds to said first merchant terminal.

An exemplary embodiment includes a computer readable medium for authorizing a purchase transaction, the computer readable medium storing instructions comprising: issuing of a prepaid card to a cardholder, wherein said prepaid card comprises a corresponding prepaid account managed by a first authorization switch; associating of a funding account identifier to said prepaid account, wherein said funding account identifier comprises a corresponding funding account managed by a second authorization switch; initiating, by said cardholder, a primary authorization request using said prepaid card; initiating, by said first authorization switch, a secondary authorization request using said funding account identifier; authorizing, by said second authorization switch, said secondary authorization request using said funding account identifier; authorizing, by said first authorization switch, said primary authorization request using the response from said secondary authorization request.

DRAWINGS—REFERENCE NUMERALS

110—Cardholder
120—Merchant terminal
125—Network
130—Merchant gateway
135—Network
140—Authorization switch
141—Prepaid card
142—Prepaid account
310—Cardholder
320—First merchant terminal
325—Network
330—Merchant gateway
335—Network
340—First authorization switch
341—Prepaid card
342—Prepaid account 343—Second merchant terminal
345—Network
350—Merchant gateway
355—Network
360—Second authorization switch
361—Funding account identifier
362—Funding account

DETAILED DESCRIPTION

Hereinafter, the present disclosure will be described in detail by explaining exemplary embodiments of the disclosure with reference to the attached drawings.

Figure 1:
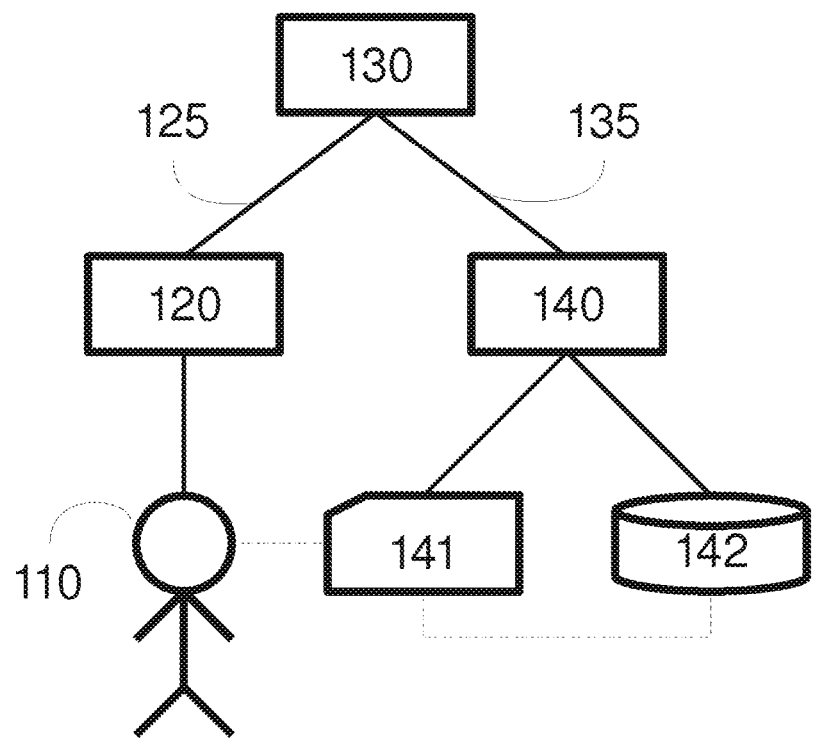
FIG. 1 illustrates a schematic block diagram of the configuration of components involved in a system in the prior art.
Figure 2:
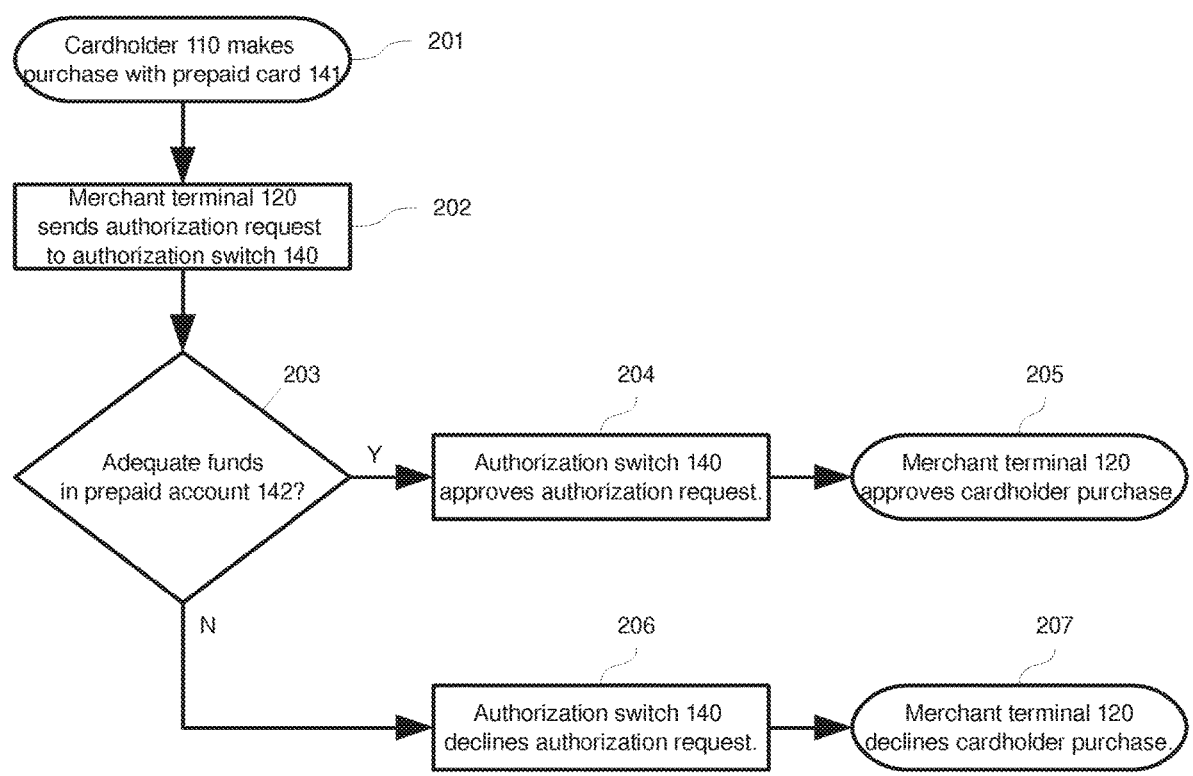
FIG. 2 illustrates a flowchart of operations involved in a method of performing an authorization request in the prior art.
Figure 3:
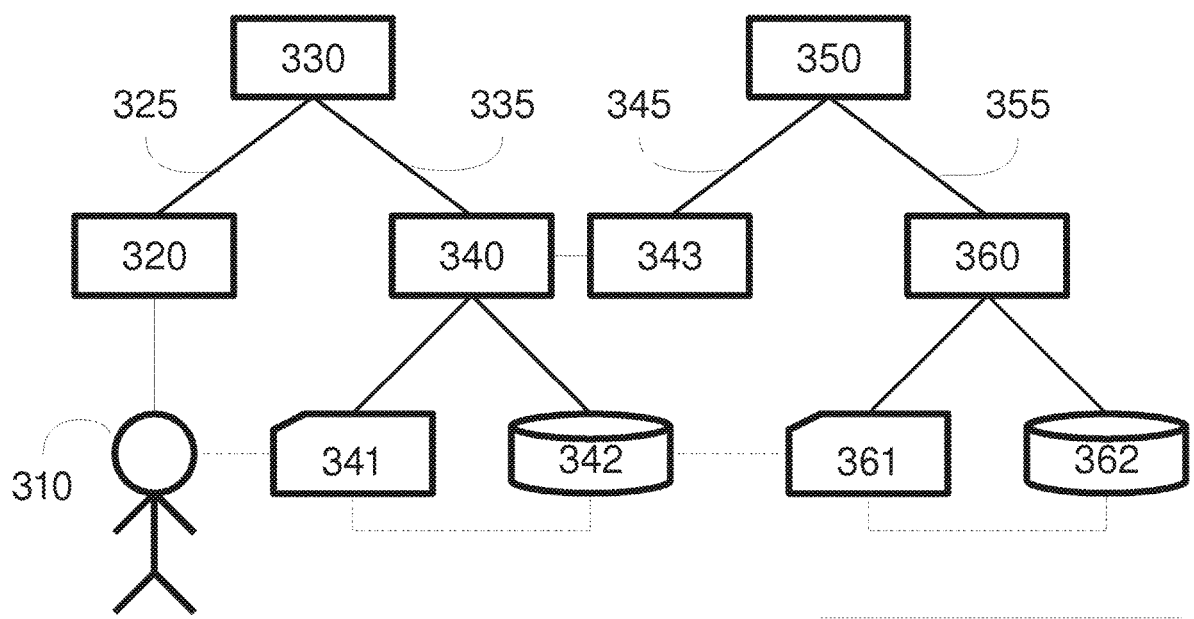
FIG. 3 illustrates a schematic block diagram of the configuration of components involved in the system in the exemplary embodiment of the present disclosure.

An exemplary embodiment of the system is illustrated in FIG. 3. The system involves a cardholder 310 interfacing with a first merchant terminal 320 connected via network 325 to a merchant gateway 330, which is in turn connected via network 335 to a first authorization switch 340. The system also involves a prepaid card 341, which is managed by authorization switch 340, held by cardholder 310, and associated with prepaid account 342. The system also involves a second merchant terminal 343 connected to the first authorization switch 340, and connected via network 345 to a merchant gateway 350, which is in turn connected via network 355 to a second authorization switch 360. The system also involves a funding account identifier 361, which is managed by authorization switch 360, and associated with both prepaid account 342 and funding account 362.

In the exemplary embodiment, one or more of the networks 325, 335, 345, and 355 are "open loop" financial networks, such as the Visa™, MasterCard™, Discover™, Automated Clearing House (ACH), eCheck™, or IP Commerce Payment Transaction Layer Switching (PTLS). In another embodiment, one or more of the networks are "closed loop" networks, such as the incentive card programs by Starbucks, Safeway, malls, and other merchants or coalitions of merchants. In another embodiment, one or more of the networks are general-purpose networks such as HTTP, FTP, SFTP, email, 802.11 wireless networks, Ethernet, fiberoptic, or internet networks. In the exemplary embodiment, one or more of the merchant gateways 330 and 350 bridge one or more different networks, such as receiving authorization requests over one or more general-purpose networks and sending via one or more dedicated financial networks.

In the exemplary embodiment, one or more of the merchant terminals 320 and 343 are Point of Sale (PoS) terminals in which payment information from an electronic payment card is read by physically "swiping" through a magnetic card reader, scanning with an optical mechanism such as a laser barcode reader, scanning with an electromagnetic system such as Radio Frequency Identifiers (RFID), or manually entering such as with keyboard or touch screen. Examples of such PoS systems include cash registers, card-swipe terminals, and ATMs. In another embodiment, one or more of the merchant terminals 320 and 343 are automated servers in which payment information is submitted electronically via a network, such as in a "mail order telephone order" (MOTO) service or internet merchant service. In the exemplary embodiment, merchant terminal 320 is used at a physical "brick and mortar" merchant establishment, such as a grocery store. In another embodiment, merchant terminal 320 is used at an online service, such as a website.

In the exemplary embodiment, the authorization switches 340 and 360 are computers comprising one or more of a CPU, RAM, hard-drive, and networking card configured in such a fashion as to receive authorization requests from a network, parse the requests to obtain payment information (such as the prepaid card 341 or funding account identifier 361), and use that payment information to retrieve a data record representing one or more of a monetary account at a bank, personal identifying information about the account owner, historical purchase information for that account, preferences of the account holder, and account identifiers of additional sources of funds.

In the exemplary embodiment, prepaid account 342 is a data record stored in one or more of RAM, magnetic disk, or Flash array, and includes a funding account identifier 361 and all corresponding information necessary to initiate an authorization request for funds to be transferred from funding account 362 into prepaid account 342. In the exemplary embodiment, authorization switches 340 and 360 store accounts 342 and 362, respectively, in a database.

In the exemplary embodiment, the authorization switch 340 is configured with the capability to initiate authorization requests via merchant terminal 343. For example, in an exemplary embodiment, authorization switch 340 communicates with merchant terminal 343 over a network, such as a LAN, or the internet. In another embodiment, merchant terminal 343 is combined with prepaid switch 340 on a single computer. In the exemplary embodiment, first authorization switch 340 and second merchant terminal are owned and operated by the same organization, such as a financial institution. In another embodiment, first authorization switch 340 and second merchant terminal 343 are operated by separate organizations, for example by a prepaid card processor and a prepaid card reseller, respectively.

In the exemplary embodiment, cardholder 310 physically holds, for example, a plastic electronic payment card, encoded with information corresponding to prepaid card 341. In another embodiment, cardholder 310 knows enough information about prepaid card 341 to directly supply it to an manual input terminal (such as a keyboard or touch-screen device, or a web-based input form) including one or more of the card's Primary Account Number (PAN), expiration date, associated billing address, card security code (CSC), card verification value (CVV), card verification value code (CVVC), card verification code (CVC), verification code (V-Code), and personal identification number (PIN).

In the exemplary embodiment, authorization switch 340 is operated by the same financial institution (or partners) that issues prepaid card 341 and manages prepaid account 342. Also, in the exemplary embodiment, authorization switch 360 is operated by the same financial institution (or partners) that issues funding account identifier 361 and manages funding account 362. In the exemplary embodiment, these financial institutions are banks.

In the exemplary embodiment, prepaid account 342 is a prepaid or "stored value" account. In another embodiment, prepaid account 342 is a line of credit (in which prepaid card 341 is actually a credit card). In the exemplary embodiment, funding account identifier 361 is a checking account number and funding account 362 is a checking account. In another embodiment, funding account identifier 361 is a credit card number and funding account 362 is a line of credit. In the exemplary embodiment, both prepaid account 342 and funding account 362 store value in the same currency (e.g., USD). In another embodiment, prepaid account 342 and funding account 362 store value in different currencies, and a currency exchange is preformed between the two.

In the exemplary embodiment, one entity has legal ownership over both the prepaid account 342 and funding account 362, where the cardholder funds his prepaid card with his own account. In an alternate embodiment, prepaid account 342 and funding account 362 are legally owned by different entities, where the prepaid card is held by one entity (e.g., an employee) but funded by another entity (e.g., an employer).

Figure 4:
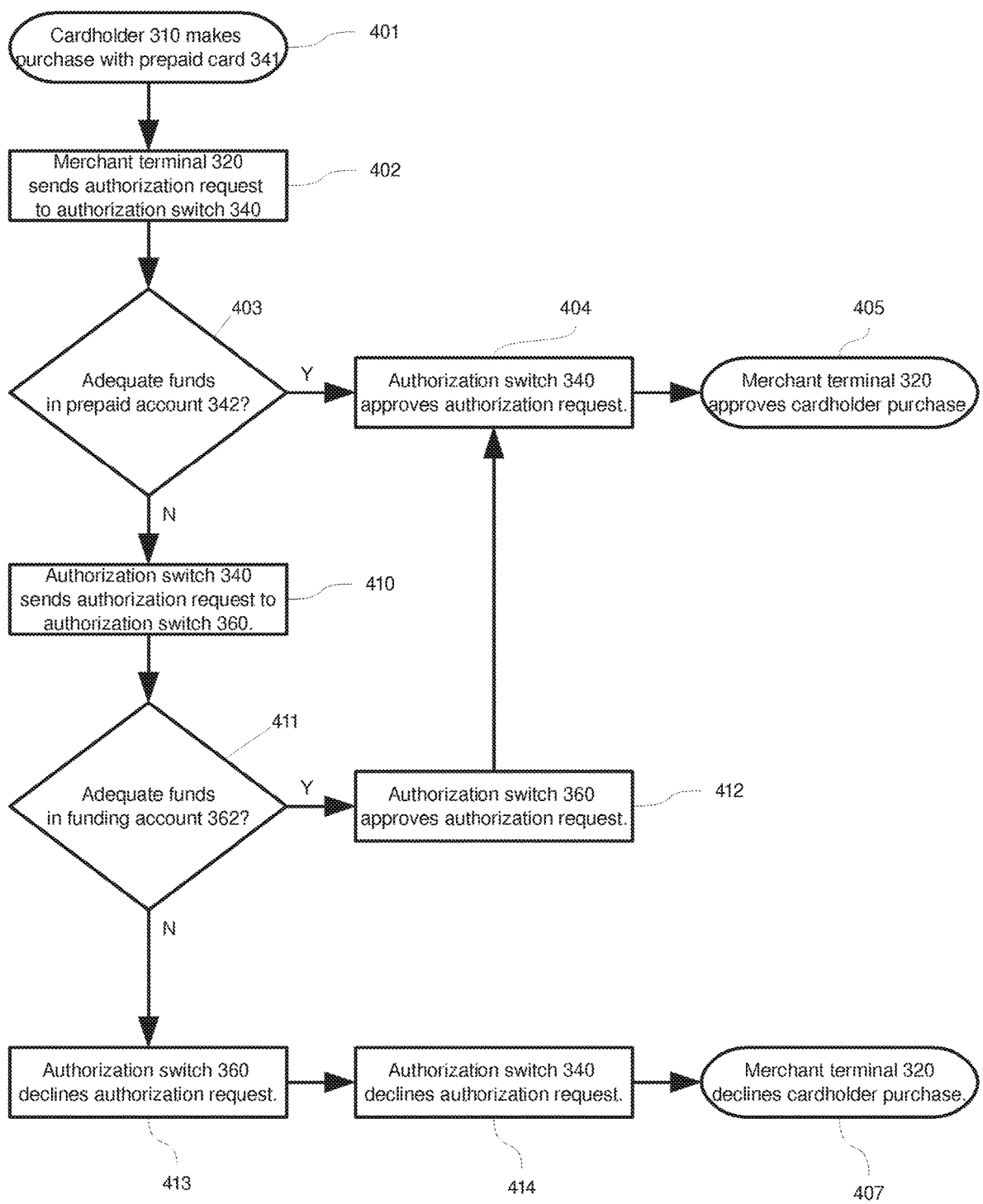
FIG. 4 illustrates a flowchart of operations involved in the method of performing an authorization request in the exemplary embodiment.

Operation—FIG. 4

The manner of executing the system in FIG. 3 is illustrated by the flowchart in FIG. 4, and starts with step 401, where cardholder 310 presents prepaid card 341 (or presents the information contained on the card) to merchant terminal 320 as means of payment for a given purchase.

In step 402, merchant terminal 320 generates a primary authorization request including at least information from prepaid card 341 and the amount of the payment, and sends this primary authorization request via network 325 to merchant gateway 330. Merchant gateway 330 uses the information stored in the primary authorization request (such as the BIN of the prepaid card 341) to determine which network 335 is relevant to this request. Merchant gateway 330 then dispatches the primary authorization request via network 335 to authorization switch 340.

In the exemplary embodiment, in step 403 the first authorization switch 340 uses the information stored in the primary authorization request (such as the prepaid card 341) to retrieve the prepaid account 342 from a database. In the exemplary embodiment, prepaid account 342 includes one or more of a current account balance, user preferences of the account holder, and funding account identifier 361. In the exemplary embodiment, if there are adequate funds in prepaid account 342 to compensate the purchase amount specified in the primary authorization request, authorizations switch 340 immediately responds with approval to the primary authorization request via network 335, as described in step 404.

However, if instead the funds in prepaid account 342 are inadequate to compensate the purchase amount, in the exemplary embodiment authorization switch 340 initiates a secondary authorization as described in step 410.

In step 410, authorization switch 340 initiates a secondary authorization request via merchant terminal 343 to obtain payment or a "promise to pay" from funding account 362 using funding account identifier 361. In an exemplary embodiment, the second authorization switch commits to transfer funds from the funding account 362 into the prepaid account 342 within a certain timeframe, such as 2-3 business days. In another embodiment, the payment funds are immediately transferred from funding account 362 to prepaid account 342.

In an alternate embodiment, user preferences stored in prepaid account 342 regulate the determination as to whether to initiate a secondary authorization request or instead immediately decline the primary authorization request and thereby terminate the purchase. In another embodiment, authorization switch 340 uses information in the primary authorization request and prepaid account 342 to decline the primary authorization request even if adequate funds are available, such as to enforce purchase policies or budget restrictions (e.g., to decline purchases from certain merchants, with certain amounts, at certain times or days, from certain geographic locations, with certain keywords appearing in the authorization request, etc). In another embodiment authorization switch 340 both immediately approves the primary authorization request and initiates a secondary authorization transaction, such as to trigger a "re-loading" operation on the prepaid card to replace the funds that are being spent on the current purchase. In another embodiment, the authorization switch 340 triggers additional operations at the time of receiving the authorization request, such as inserting data into a database, or sending an email or SMS message.

In the exemplary embodiment, authorization switch 340 explicitly initiates a secondary authorization request by notifying the second merchant terminal 343 directly. This is called a "push" operation. In another embodiment, authorization switch 340 implicitly initiates a secondary authorization request by waiting for second merchant terminal 343 to request a list of new primary authorization requests. This is called a "pull" or "polling" operation. In one embodiment, second merchant terminal 343 polls first authorization switch 340 for new authorization requests daily, nightly, hourly, or on some other regular frequency. In another embodiment, it polls at an irregular frequency, or when triggered by an outside event.

In one embodiment, merchant terminal 343 monitors authorization switch 340 by regularly polling to discover new primary authorization requests, and then automatically bills funding account 362 for the necessary amount to "top off" the prepaid card by reloading it back up to some predetermined amount, such as an amount recorded in prepaid account 342. In this embodiment, the customer (e.g., owner of the funding account) specifies a "budget" for the prepaid card and authorizes the authorization switch to automatically bill the customer after each purchase for the amount of the purchase (plus a surcharge) in order to reload the card back up to the budget amount. In an exemplary embodiment, the top-off billing is completely automatic and occurs with no human intervention. In another embodiment, the billing occurs only after the customer or cardholder or other authorized entity manually confirms the top-off operation.

If authorization switch 340 initiates a secondary authorization request in step 410, merchant terminal 343 sends a secondary authorization request via network 345 that includes funding account identifier 361 and a secondary purchase amount. In the exemplary embodiment, the purchase amount of the secondary authorization request is greater than or equal to the amount of the primary authorization request. In another embodiment, the purchase amount of the secondary authorization request is less than the purchase amount in the primary authorization request. In another embodiment, the purchase amount of the secondary authorization request is in a different currency than the purchase amount in the primary authorization request. In another embodiment, the first authorizations switch 340 uses information in the primary authorization request and prepaid account 342 to issue two or more secondary authorization requests using one or more funding account identifiers, such as to split the purchase amount between multiple funding accounts or to direct certain types of purchases to certain funding accounts.

In step 410, merchant gateway 350 uses the information stored in the secondary authorization request (such as funding account identifier 361) to determine which network 355 is relevant to this request. Merchant gateway 350 then dispatches the secondary authorization request via network 355 to authorization switch 360.

In step 411, in the exemplary embodiment the second authorization switch 360 uses the information stored in the secondary authorization request (such as the funding account identifier 361) to retrieve funding account 362 from a database. In the exemplary embodiment, funding account 362 includes a current account balance. In the exemplary embodiment, if there are adequate funds in funding account 362 to compensate the purchase amount of the secondary authorization request, authorization switch 360 approves the secondary authorization request via network 355. Similarly, in the exemplary embodiment, if there are inadequate funds in funding account 362 to compensate the purchase amount of the secondary authorization request, authorization switch 360 declines the secondary authorization request via network 355. In an alternate embodiment, rather than decline the secondary authorization request, authorization switch 360 generates a ternary authorization request via another merchant terminal.

When the second authorization switch responds to the secondary authorization request via network 355 (whether approved as in step 412 or declined as in step 413), merchant gateway 350 uses information in the response (such as the funding account identifier 361) to determine which network is relevant to the response. Merchant gateway 350 then dispatches the secondary authorization response via network 345 to merchant terminal 343, which then returns the secondary authorization response to the first authorization switch 340.

In the exemplary embodiment, upon receiving a response to the secondary authorization request from merchant terminal 343, first authorization switch 340 approves or declines the primary authorization request via network 335 depending on whether the secondary authorization request was approved or declined, respectively. In another embodiment, the authorization switch 340 triggers additional operations at the time of sending the authorization response, such as inserting data into a database, or sending an email or SMS message.

When the first authorization switch responds to the primary authorization request via network 335 (whether approved as in step 404 or declined as in step 414), merchant gateway 330 uses information in the response (such as the prepaid account identifier 341) to determine which network is relevant to the response. Merchant gateway 330 then dispatches the primary authorization response via network 325 to merchant terminal 320. Merchant terminal 320 then returns the primary authorization response to the cardholder, and either approves the purchase request as in step 405 or declines the purchase request as in step 407, thereby completing the purchase transaction.

Operation of Alternate Embodiment—Increments, Reversals, Voids, and Returns

Authorization requests are just one several types of transactions, others including increments, reversals, voids, and returns. In all cases, direct equivalents exist to apply the system, computer readable medium, and method of the present disclosure to these other transaction types.

Accordingly, in another exemplary embodiment, the primary and secondary authorization requests are instead replaced with primary and secondary increment requests, respectively. In this embodiment the merchant terminal is requesting authorization to increase a previous authorization. This primary increment request is transmitted and processed according to the present disclosure, with the primary increment request being initiated by the cardholder 310 via merchant terminal 320, sent via network 325 to merchant gateway 330, sent via network 335 to first authorization switch 340, which determines using information in prepaid card 341 and prepaid account 342 whether to approve or decline immediately or initiate a secondary increment request via merchant terminal 343, send the secondary increment request via network 345 to merchant gateway 350, send via network 355 to the second authorization switch 360 which determines whether to approve or decline the increment using information in the funding account identifier 361 and funding account 362, and finally send the response back via network 355 through merchant gateway 350, network 345, merchant terminal 343, authorization switch 340, network 335, merchant gateway 330, network 325, merchant terminal 320, and ultimately back to the cardholder 310 in the form of an approved or rejected purchase adjustment. Additional embodiments exist as direct parallels for reversals (where a portion of a previously approved authorization is being returned), voids (where an unsettled transaction is canceled in entirety), and returns (where a previously settled transaction is being refunded).

Operation of Alternate Embodiment—Chargebacks

Another type of transaction commonly found in financial network is the chargeback. Exemplary embodiments exist where the system, computer readable medium, and method of the present disclosure is essentially conducted in "reverse," where the transaction is not initiated by the cardholder 310, but rather initiated by the owner of funding account 362. This reverse method is illustrated in FIG. 5.

Figure 5:
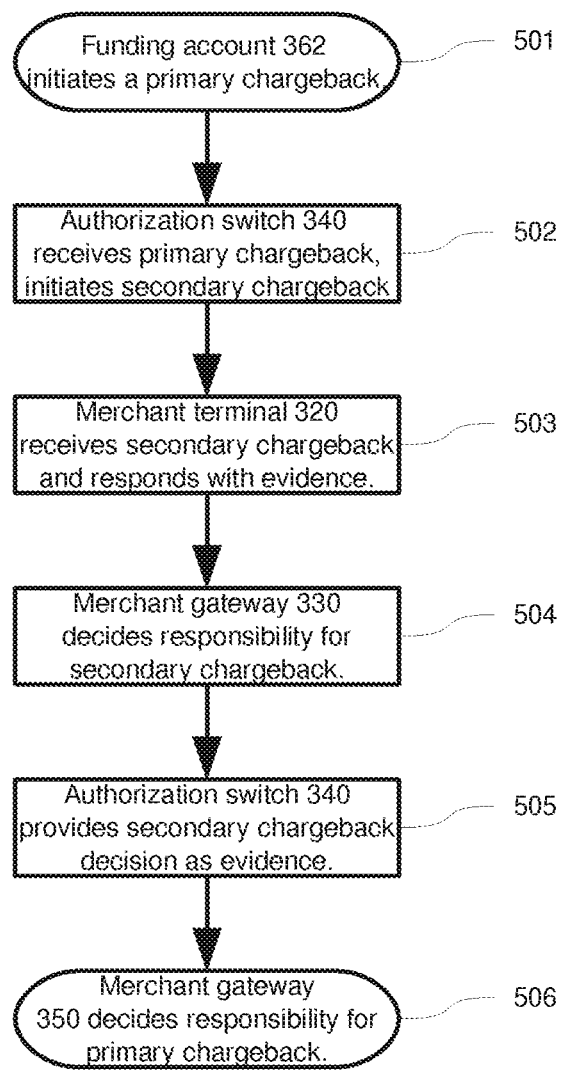
FIG. 5 illustrates a flowchart of operations involved in the method of performing a chargeback in the exemplary embodiment.

The manner of executing the system in FIG. 3 in reverse to process a chargeback transaction is illustrated by the flowchart in FIG. 5, and starts with step 501 where the owner of funding account 362 notifies second authorization switch 360 that a particular purchase is being disputed.

In step 501, authorization switch 360 initiates a primary chargeback via network 355 to merchant gateway 350, which in turn communicates the primary chargeback via network 345 to second merchant terminal 343. Included with this primary chargeback is evidence including, for example, a signed statement by the cardholder that the purchase is fraudulent, evidence that the cardholder was physically elsewhere when the purchase was made, etc.

In step 502, merchant terminal 342 notifies first authorization switch 340 that one of its secondary authorization requests is being disputed by the owner of funding account 362. This causes first authorization switch to in turn dispute the primary authorization request that caused it to initiate the secondary authorization request, by initiating a secondary chargeback via network 335 to merchant gateway 330, which in turn communicates the secondary chargeback via network 325 to merchant terminal 320. Included with this secondary chargeback is evidence including, for example, transaction logs proving that the primary authorization request was in fact received, that ample balance in the prepaid card account 342 was not available, etc.

In step 503, merchant terminal 320 responds to the secondary chargeback via network 325 to merchant gateway 330 with evidence justifying that the purchase was legitimate. This evidence can for example be a photocopy of a signed receipt, proof that the AVS code was properly received, camera footage of the cardholder making the purchase, etc.

In step 504, merchant gateway 330 determines, in conjunction with for example Visa or MasterCard, whether merchant terminal 320 or first authorization switch 340 has offered a stronger case as to whether the purchase is legitimate or illegitimate, and communicates the decision to the secondary chargeback via networks 325 and 335 to merchant terminal 320 and first authorization switch 340, respectively.

In step 505, first authorization switch 340 provides the result of the secondary chargeback decision by merchant gateway 330 as evidence to merchant terminal 343, which in turn communicates this evidence via network 345 to merchant gateway 350.

In step 506, merchant gateway 350 determines, in conjunction with for example Visa or MasterCard, whether merchant terminal 343 or second authorization switch 360 has offered a stronger case as to whether the purchase is legitimate or illegitimate, and communicates the decision of the primary chargeback via network 345 and 355 to merchant terminal 343 and second authorization switch 360, respectively.

In one such embodiment, given the less automated nature of chargebacks, one or more of networks 325, 335, 345, and 355 are telephone, fax, email, internet, Federal Express, UPS, and the US Postal Service.

A key advantage of the exemplary embodiment over the prior art is the use of the response of the secondary chargeback as evidence to defend against the primary chargeback. In the prior art, making a purchase with the prepaid card and loading funds onto the card are two distinct and unrelated actions: when faced with a chargeback claim from a customer, the prepaid card issuer has only internal records that the customer requested the funds be reloaded, and these records might be subject to dispute.

Conceivably, in the prior art a cardholder could successfully dispute loading funds onto the card by challenging the record that such a load was requested. This dispute could stand despite the customer admitting to have used the prepaid card to make a purchase—essentially saying "yes, I kept using the card with the understanding that it would stop working when the funds I loaded ran out; it's not my fault you incorrectly billed me and put extra funds onto the card." In this scenario, the prepaid card vendor has no choice but to reimburse the customer without being able to obtain compensation from the vendor.

In the exemplary embodiment, however, funds are reloaded onto the prepaid in line with or in response to a purchase being made with the prepaid card. Because the record of a customer making a purchase with a prepaid card is very reliable (with the merchant bank and network being able to confirm the transaction did in fact take place), by creating clear terms of service to which the customer must agree to follow (such as by including a printed copy with the physical mailing of the card itself, as well as requiring the customer to agree to the terms when activating the card), the prepaid issuer can demonstrate that the cardholder has pre-authorize billing in response to a valid prepaid card purchase and thereby protect itself against a class of chargebacks that might otherwise leave it vulnerable.

For example, in the above scenario where the customer admits to making the purchase but disputes being billed, the prepaid issuer would simply point to the terms of service that enable it to bill the customer in response to any non-fraudulent purchase. The result is the cardholder can only dispute billing from the prepaid card if in fact the purchase that triggered the billing is deemed fraudulent (e.g., with a stolen prepaid card). But in this situation the merchant must reimburse the prepaid issuer, and thus once again, the prepaid issuer is protected against reimbursing the customer without itself being reimbursed by the merchant.

From the description above, a number of exemplary benefits of exemplary embodiments of the system, computer readable medium, and method of the present disclosure become evident, including but not limited to:

(a) By initiating a secondary authorization request, a prepaid card issuer can optionally authorize purchases despite inadequate funds being present on the card, but without the corresponding risk of a credit card as the "promise to pay" returned by the funding account is as reliable as cash. Accordingly, every purchase with the prepaid card is still "prepaid" in the sense the issuer is extending no credit to the cardholder. However, the cardholder enjoys the benefit of not needing to explicitly load funds onto the card in advance of the purchase. Rather, funds are loaded onto the card "on-demand", inline with the purchase transaction itself.

(b) By placing a prepaid card "between" the merchant and a funding account, the issuer of the prepaid card has a low-risk, low-cost platform to gather detailed information about the cardholder purchases without requiring the customer to switch banks or apply for a new line of credit. Rather, the prepaid issuer can safely issue a prepaid card to the cardholder that is "funded" by whichever credit card or checking account the customer normally uses for purchases. The only behavioral change required by the cardholder is they make purchases with the new prepaid card rather than their typical card. Once done, the prepaid issuer is able to seamlessly intercept and log all purchases made by the customer, enabling the issuer to offer value-added services that use this data. But because all purchases are individually billed back to the customer's regular credit card or checking account, the customer is not sent a new monthly bill and doesn't need to alter habits around financial planning.

(c) Because the prepaid card intercepts all authorization requests destined for the funding account, the prepaid card can apply "filtering" rules to optionally decline transactions based on merchant name, industry code, transaction time, purchase amount, and so on. One use of this is to enable the cardholder to set budget rules and purchase policies that are explicitly enforced by the card, as a way of eliminating the temptation to violate these rules. However, the party who funds the card needn't be the party who holds the card. In this case, an employer could issue to all employee prepaid cards that are centrally funded by the company. The company could then set per-card purchase policies and budgets that are enforced by the prepaid card, even when the funding account would otherwise authorize the purchase.

(d) Furthermore, the prepaid card could have multiple funding accounts associated with it, with rules for allocating or splitting purchases between those accounts. For example, a small business with two owners who agree to split all business purchases could create a prepaid card configured to bill each funding account for half of the prepaid purchase, thereby implicitly enforcing the business agreement in place.

(e) Similarly, the prepaid card could consolidate multiple funding accounts. For example, if a cardholder has both a credit card and a checking account, the prepaid card could be configured to first attempt to bill the checking account direct and—failing that—bill the credit card. Or the prepaid card could consolidate multiple credit cards into a single "virtual credit card" with a credit limit equal to the sum of all cards.

(f) The most common prepaid product is the "gift card"—where rather than giving cash you instead give a prepaid card. One downside of this product is the gift giver must spend cash up front to get the card, even if the card itself isn't fully used, is never used, or is even lost. With an "on-demand prepaid" card the gift-giver only pays when the recipient actually uses the card.

(g) On top of all these benefits, the issuer of the prepaid card is protected from "chargebacks" where the owner of the funding account disputes a secondary authorization request. Whether the networks determine the funding account owner or merchant should pay, in all cases the prepaid issuer is protected.

CONCLUSIONS, RAMIFICATIONS, AND SCOPE

Accordingly, this system, computer readable medium, and method of loading prepaid cards with funds "on-demand" maintains the benefits prepaid cards offer issuers while reducing the disadvantages experienced by the customer. Furthermore, the system has the additional benefits in that:

it permits prepaid cards to be loaded only when and with the precise amount necessary to support a given purchase, rather than speculatively before the purchase has been decided;

it provides a low-risk, low-cost platform for providers of value-added data services to sit between existing merchants and funding accounts and gather data;

it enables purchase-policy and budget filters to be layered atop existing funding accounts for proactive enforcement (rather than reactive correction);

it enables purchases to be routed to and split between funding accounts using arbitrary rule sets specified by the card issuer, fund owner, and cardholder;

Although the description above contains many specificities, these should not be construed as limited the scope of the embodiments but as merely providing illustrations of some of the presently exemplary embodiments. Thus, the scope of the embodiments should be determined by the appended claims and their legal equivalents, rather than by the examples given above.

What is claimed is:

1. A computing system comprising:
a network communication interface to communicate, over one or more networks, with (i) computing devices of users of a transaction service, and (ii) merchant terminals of merchants participating in the transaction service;
one or more processors; and
a memory storing instructions that, when executed by the one or more processors, cause the computing system to:
receive, over the one or more networks, a primary authorization request from a merchant terminal of a merchant, the primary authorization request corresponding to use of a prepaid card of a user of the transaction service for a transaction with the merchant;
based on receiving the primary authorization request, determine that an account balance of the prepaid card comprises inadequate funds to fulfill the transaction;
based on determining that the account balance comprises inadequate funds to fulfill the transaction, automatically transmit, over the one or more networks, a secondary authorization request to a financial entity associated with an account of the user;
receive, over the one or more networks and from the financial entity associated with the account of the user, an approval of the secondary authorization request to facilitate funding the transaction with the merchant; and based on receiving the approval, execute a transfer for a difference amount, based on an amount corresponding to the transaction, from the account of the user to an account associated with the merchant.

2. The computing system of claim 1, wherein the executed instructions cause the computing system to execute the transfer by loading funds from the account of the user into the account associated with the merchant to replace a recorded balance corresponding to the transaction.

3. The computing system of claim 1, wherein the executed instructions cause the computing system to:
select one of multiple funding accounts associated with the card; and
transmit the secondary authorization request with an account identifier for the selected funding account of the multiple funding accounts to enable the financial entity to identify and transfer funds from the selected funding account.

4. The computing system of claim 1, wherein the executed instructions further cause the computing system to:
associate the prepaid card with a set of filtering rules for declining transactions.

5. The computing system of claim 4, wherein the set of filtering rules are implemented to decline the transaction based on at least one of a merchant name, an industry code, a transaction time, or a purchase amount.

6. The computing system of claim 1, wherein the secondary authorization request queries the financial entity of whether the user has sufficient funds in the account of the user to cover the transaction.

7. The computing system of claim 1, wherein the executed instructions further cause the computing system to:
transmit, over the one or more networks, a notification indicating that the secondary authorization request is approved.

8. The computing system of claim 7, wherein the notification is transmitted to the computing device of the user.

9. The computing system of claim 7, wherein the notification is transmitted to the merchant terminal of the merchant.

10. A non-transitory computer-readable medium storing instructions that, when executed by one or more processors of a computing system, cause the computing system to:
communicate, over one or more networks, with (i) computing devices of users of a transaction service, and (ii) merchant terminals of merchants participating in the transaction service;
receive, over the one or more networks, a primary authorization request from a merchant terminal of a merchant, the primary authorization request corresponding to use of a prepaid card of a user of the transaction service for a transaction with the merchant;
based on receiving the primary authorization request, determine that an account balance of the prepaid card comprises inadequate funds to fulfill the transaction;
based on determining that the account balance comprises inadequate funds to fulfill the transaction, automatically transmit, over the one or more networks, a secondary authorization request to a financial entity associated with an account of the user;
receive, over the one or more networks and from the financial entity associated with the account of the user, an approval of the secondary authorization request to facilitate funding the transaction with the merchant; and
based on receiving the approval, execute a transfer for a difference amount, based on an amount corresponding to the transaction, from the account of the user to an account associated with the merchant.

11. The non-transitory computer-readable medium of claim 10, wherein the executed instructions cause the computing system to execute the transfer by loading funds from the account of the user into the account associated with the merchant to replace a recorded balance corresponding to the transaction.

12. The non-transitory computer-readable medium of claim 10, wherein the executed instructions cause the computing system to:
   select one of multiple funding accounts associated with the card; and
   transmit the secondary authorization request with an account identifier for the selected funding account of the multiple funding accounts to enable the financial entity to identify and transfer funds from the selected funding account.

13. The non-transitory computer-readable medium of claim 10, wherein the executed instructions further cause the computing system to:
   associate the prepaid card with a set of filtering rules for declining transactions.

14. The non-transitory computer-readable medium of claim 13, wherein the set of filtering rules are implemented to decline the transaction based on at least one of a merchant name, an industry code, a transaction time, or a purchase amount.

15. The non-transitory computer-readable medium of claim 10, wherein the secondary authorization request queries the financial entity of whether the user has sufficient funds in the account to cover the transaction.

16. The non-transitory computer-readable medium of claim 10, wherein the executed instructions further cause the computing system to:
   transmit, over the one or more networks, a notification indicating that the secondary authorization request is approved.

17. The non-transitory computer-readable medium of claim 16, wherein the notification is transmitted to the computing device of the user.

18. The non-transitory computer-readable medium of claim 16, wherein the notification is transmitted to the merchant terminal of the merchant.

19. A computer-implemented method for authorizing prepaid transactions, the method being performed by one or more processors and comprising:
   communicating, over one or more networks, with (i) computing devices of users of a transaction service, and (ii) merchant terminals of merchants participating in the transaction service;
   receiving, over the one or more networks, a primary authorization request from a merchant terminal of a merchant, the primary authorization request corresponding to use of a prepaid card of a user of the transaction service for a transaction with the merchant;
   based on receiving the primary authorization request, determining that an account balance of the prepaid card comprises inadequate funds to fulfill the transaction;
   based on determining that the account balance comprises inadequate funds to fulfill the transaction, automatically transmitting, over the one or more networks, a secondary authorization request to a financial entity associated with an account of the user;
   receiving, over the one or more networks and from the financial entity associated with the account of the user, an approval of the secondary authorization request to facilitate funding the transaction with the merchant; and
   based on receiving the approval, executing a transfer for a difference amount, based on an amount corresponding to the transaction, from the account of the user to an account associated with the merchant.

20. The method of claim 19, wherein one or more processors execute the transfer by loading funds from the account of the user into the account associated with the merchant to replace a recorded balance corresponding to the transaction.

* * * * *